(12) United States Patent
Schoenherr

(10) Patent No.: US 10,599,838 B2
(45) Date of Patent: Mar. 24, 2020

(54) CRYPTO-RANSOMWARE COMPROMISE DETECTION

(71) Applicant: Micron Technology, Inc., Boise, ID (US)

(72) Inventor: Daniel K Schoenherr, Boise, ID (US)

(73) Assignee: MICRON TECHNOLOGY, INC., Boise, ID (US)

( * ) Notice: Subject to any disclaimer, the term of this patent is extended or adjusted under 35 U.S.C. 154(b) by 282 days.

(21) Appl. No.: 15/589,532

(22) Filed: May 8, 2017

(65) Prior Publication Data
US 2018/0324214 A1    Nov. 8, 2018

(51) Int. Cl.
  *G06F 21/55* (2013.01)
  *G06F 21/62* (2013.01)

(52) U.S. Cl.
  CPC .......... *G06F 21/552* (2013.01); *G06F 21/554* (2013.01); *G06F 21/6209* (2013.01); *G06F 2221/034* (2013.01)

(58) Field of Classification Search
  CPC . H04L 63/1491; H04L 63/145; G06F 3/0623; G06F 3/0647; G06F 3/067; G06F 21/552; G06F 2221/034
  USPC .......................................................... 726/23
  See application file for complete search history.

(56) References Cited

U.S. PATENT DOCUMENTS

| 7,324,804 B2 * | 1/2008 | Hrastar | H04L 63/1416 370/447 |
| 7,873,635 B2 * | 1/2011 | Wang | G06F 21/56 707/735 |
| 10,122,752 B1 * | 11/2018 | Soman | H04L 63/1441 |
| 2002/0157021 A1 * | 10/2002 | Sorkin | H04L 63/0227 726/4 |
| 2007/0199070 A1 | 8/2007 | Hughes | |
| 2008/0141374 A1 | 6/2008 | Sidiroglou et al. | |
| 2010/0030946 A1 * | 2/2010 | Kano | G06F 3/0608 711/103 |

(Continued)

FOREIGN PATENT DOCUMENTS

WO    WO2008-130923 A1    10/2008

OTHER PUBLICATIONS

Korean Intellectual Property Office; International Search Report and Written Opinion for Application No. PCT/US2018/030647 dated Aug. 23, 2018.

*Primary Examiner* — Michael Pyzocha
*Assistant Examiner* — Zoha Piyadehghibi Tafaghodi
(74) *Attorney, Agent, or Firm* — Parsons Behle & Latimer

(57) ABSTRACT

A memory system includes a controller having a processor and one or more memory media, and a method of operating the memory system. A host generates honeypot files and the processor is configured to write the honeypot files onto the memory media at random locations. The controller monitors the locations of the randomly distributed honeypot files for access. The host may set a mode of operation concerning access of the honeypot files randomly distributed on the memory media. In a strict mode of operation, the controller may halt access to the memory media or require authentication if a single honeypot file is accessed. In a moderate mode of operation, the controller may analyze the memory media to determine if under attack if a single honeypot file is accessed. In a light mode of operation, the controller may not take any action until a predetermined number of honeypot files are accessed.

24 Claims, 4 Drawing Sheets

(56) References Cited

U.S. PATENT DOCUMENTS

| | | | |
|---|---|---|---|
| 2011/0145918 A1* | 6/2011 | Jung | G06F 21/52 726/22 |
| 2012/0144449 A1 | 6/2012 | Peled et al. | |
| 2013/0185492 A1* | 7/2013 | Weksler | G06F 12/00 711/105 |
| 2014/0245063 A1* | 8/2014 | Baptist | G06F 11/2094 714/6.22 |
| 2015/0295943 A1 | 10/2015 | Malachi | |
| 2016/0180087 A1* | 6/2016 | Edwards | G06F 21/566 726/24 |
| 2018/0034835 A1* | 2/2018 | Iwanir | H04L 63/1416 |
| 2018/0114020 A1* | 4/2018 | Hirschberg | G06F 21/566 |
| 2018/0146009 A1* | 5/2018 | Primm | H04L 63/1491 |

\* cited by examiner

CRYPTO-RANSOMWARE COMPROMISE DETECTION

FIELD

The embodiments disclosed herein relate to preventing the malicious encryption of files by crypto-ransomware on a solid state device (SSD) memory device.

BACKGROUND

Ransomware is a type of malicious software that is used to infect electronic devices, such as computers, laptops, tablets, and smartphones, restricting access to the device until the user pays a ransom to have the device unlocked permitting access once again. There are various types of ransomware used to maliciously infect devices in an attempt to obtain a ransom payment. One such type of ransomware is crypto-ransomware.

Crypto-ransomware encrypts files that are stored on an electronic device. A user is still able to access the device, but the files, or a portion of the files, on the device are encrypted so that the files are unreadable by the user and/or the electronic device itself. A specific decryption key is needed to unscramble or decrypt the files, but the decryption key is not located on the electronic device. After the files, or a portion of the files, are maliciously encrypted, a ransom demand is displayed offering the user the requisite decryption key for a specified amount of money. In some instances, the ransom demand may provide the user with a limited time period by which to pay the ransom demand or the files will remain permanently encrypted. The premise behind crypto-ransomware is that the user will be willing to pay some sum of money when faced with the possibility of losing useable access to some, or all, of their files.

Crypto-ransomware may maliciously download onto an electronic device by various means. For example, the malicious software may be accidently downloaded while accessing a remote website, may be embedded into an attachment of an email, or may be part of the payload of other malware, such as Trojan download or exploit kits. Once the crypto-ransomware is on the device, the ransomware may systematically start encrypting files. Some versions of crypto-ransomware may hunt out specific types of files to encrypt. After the desired encryption is completed, the ransomware displays a message on the display of the electronic device that contains the ransom demand. Additional disadvantages of crypto-ransomware may exist.

Figure 1:
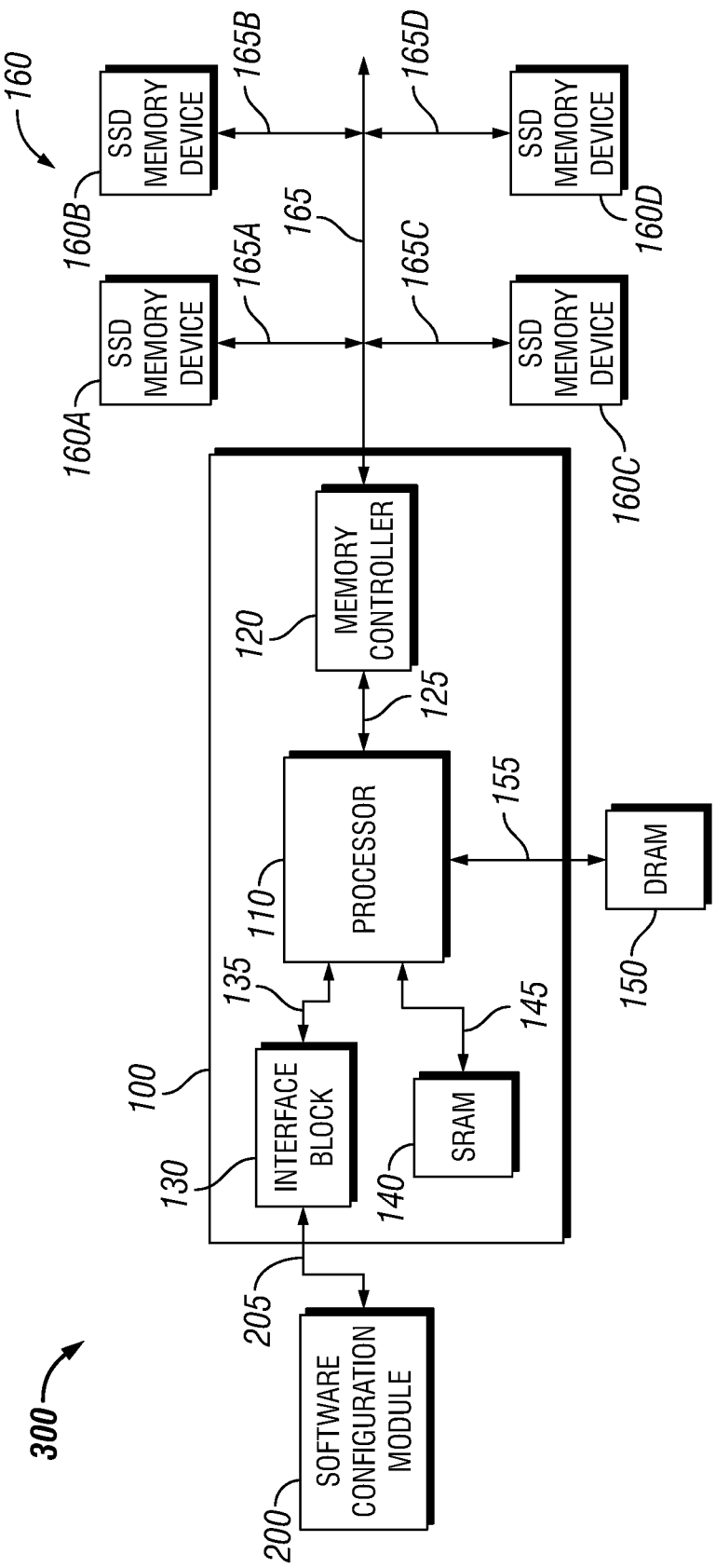
FIG. 1 is a block diagram of an embodiment of a system for the detection of crypto-ransomware in accordance with the disclosure.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the invention as defined by the appended claims.

DETAILED DESCRIPTION

FIG. 1 is a block diagram of an embodiment of a system 300 for the detection of crypto-ransomware. The system includes a SSD controller 100 that is in communication with a host 200 via an interface 205. The host 200 may be part of an electronic device, such as, but not limited to, a computer, a laptop, a tablet, or a smartphone. The interface 205 may be any type of interface through which a host connects to a solid state storage device, such as, for example, SATA, SAS, PCIe, SB, eMMC, and the like. In operation, the host 200 sends data and commands to the SSD controller 100 through the interface 205. The commands may include directions to read and/or write the data to memory media connected to the SSD controller 100, as described herein. The host 200 is configured to provide honeypot files to the SSD controller 100 for storage in the memory media, as discussed herein. The host 200 is also configured to set a mode of operation, or detection mode, and allocate a percentage of the storage of the memory media that is to be filled up with honeypot files. A honeypot is a mechanism that may be used to capture information regarding an attempt to obtain unauthorized access to the memory media. A honeypot file is a file that may be distributed onto a system and used as a "trap" if the honeypot file is accessed. A honeypot file may be generated using random data. The honeypot files are generated such that the files appear to be "normal" files that are on a system or device, but will trigger protection when there is an unauthorized access of the honeypot file. The host 200 can be configured to generate a plurality of honeypot files and distribute the honeypot files onto a SSD memory device. The host 200 may be configured to generate a plurality of honeypot files comprised of random data and may be configured to randomly distribute the honeypot files onto a SSD memory device as discussed herein.

The SSD controller 100 may be in communication with at least one memory media device. As shown in FIG. 1, the SSD controller 100 is in communication with memory media 160A, memory media 160B, memory media 160C, and memory media 160D (collectively referred to as memory media 160) via an interface 165. Each of the memory media 160A, 160B, 160C, 160D may be in communication with the interface 165 via a two-way bus 165A, 165B, 165C, 165D as shown in FIG. 1. The interface 165 may be any type of interface used to communicate data and/or commands between SSD controller 100 and memory media 160, including for example, ONFI. The memory media 160A, 160B, 160C, 160D may comprise various memory devices and technologies. For example, the memory media 160 may comprise NAND flash memory devices, NOR flash memory devices, or any other type of volatile or non-volatile memory technology and any combinations thereof. Additionally, memory media 160 may comprise logical or physical units of a single memory device or die, for example, blocks or pages of a NAND flash die. The number and configuration of the memory media 160A, 160B, 160C, 160D is shown for illustrative purposes and may be varied depending on the application as would be appreciated by one of ordinary skill in the art having the benefit of this disclosure.

The SSD controller 100 includes a processor 110, a media controller 120, a host interface block 130, and static random access memory (SRAM) 140. The SSD controller 100 may be connected to dynamic random access memory (DRAM) 150. The media controller 120 controls the operation of the memory media 160A, 160B, 160C, 160D via the interface 165 and the media controller 120 is in communication with the processor 110 via bus 125. The SRAM 140 is in communication with the processor 110 via bus 145 and the DRAM 150 is in communication with the processor 110 via bus 155. The host interface block 130 is in communication with the processor 110 via bus 135 and the host interface block 130 interfaces between the processor 110 and the host 200.

A plurality of honeypot files generated by the host 200 may be transferred to the processor 110 via the host interface block 130. The processor 110 includes firmware configured to operate the processor 110. When providing the honeypot files, the host 200 may direct where to store the honeypot files on memory media 160, or alternatively, the processor 110 may determine where to store the honeypot files on memory media 160. For example, the processor 110 may have the media controller 120 randomly distribute the honeypot files to the memory media 160A, 160B, 160C, 160D being controlled by the media controller 120. The processor 110 may provide an acknowledgement to the host 200 of the writing of the honeypot files to the memory media 160A, 160B, 160C, 160D. The processor 110 may also receive the mode of operation, or detection mode, designated by the host 200 via the host interface block 130. Alternatively, the mode of operation, also referred to as a detection mode, may be determined by the processor 110 based on stored configuration information and/or the firmware. The distributed locations on the memory media 160 of the honeypot files are recorded by the processor 110. As an example, the processor 110 may maintain a table of file location information for the memory media 160 and the table may include the locations of the honeypot files. As discussed herein, crypto-ransomware attempts to access files on a device in order to encrypt the files and demand a ransom payment from the user for the key required to decrypt the encrypted files. The processor 110 is configured to monitor read and/or write requests from the host 200 to the recorded locations on memory media 160 of the randomly distributed honeypots to determine whether any of the recorded locations are accessed and, if so, take an action based on the designated mode of operation, as discussed herein. The SSD controller 100 may be an ASIC, an FGPA, or other logic device. Although the system 300 has been described with reference to a solid state drive hardware environment, one of ordinary skill in the art will appreciate that other systems and/or hardware environments are with the concepts of this disclosure including for example, USB and other flash media drives, eMMC/UFS drives, and the like. Additionally, although certain functions and data generation have been attributed to the host 200, one of ordinary skill in the art will appreciate that such functions and/or data generation may be performed by the SSD controller 100 and/or the associated firmware.

Figure 2:
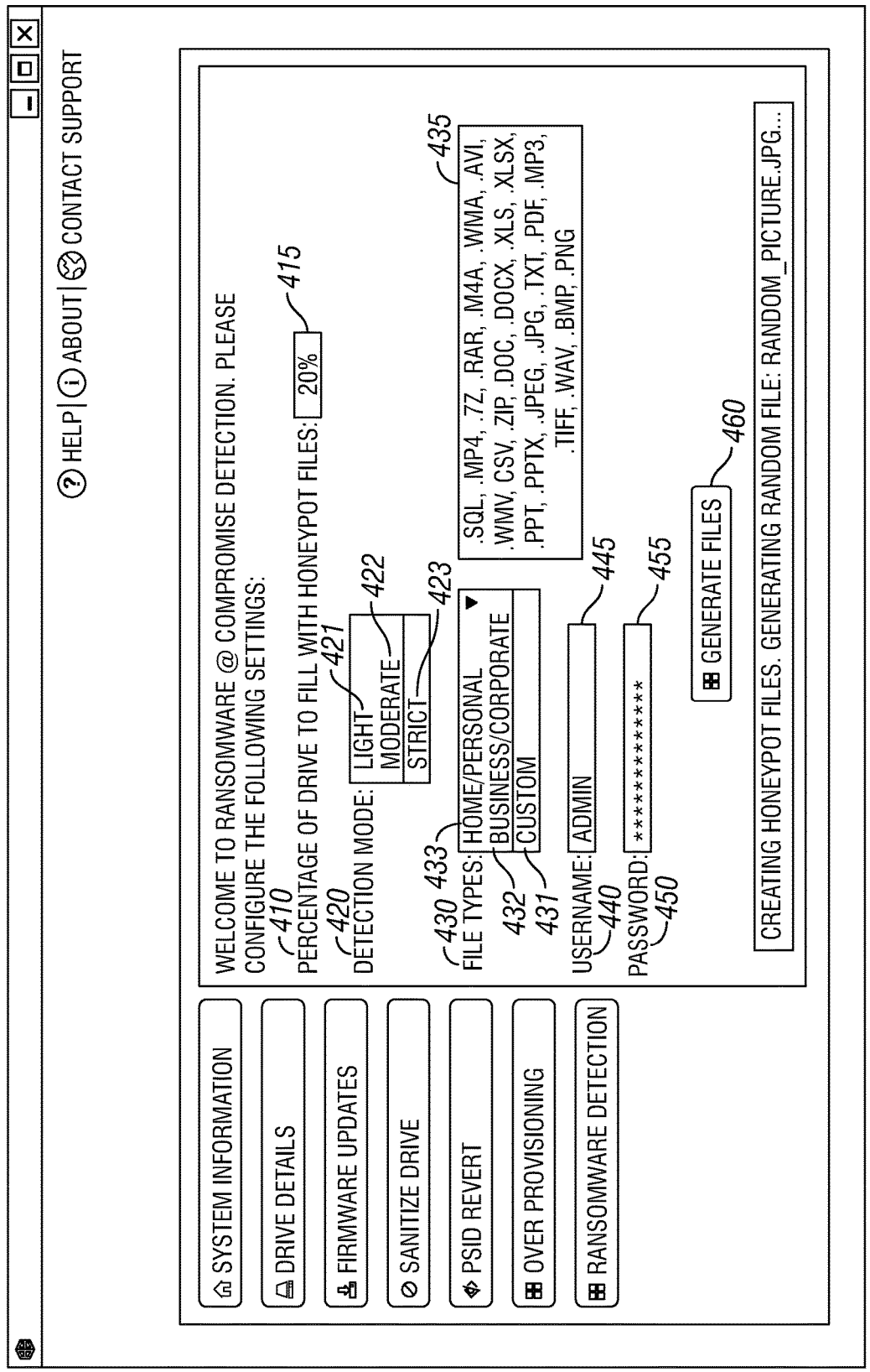
FIG. 2 is a schematic of an embodiment of a graphical user interface (GUI) of a system for the detection of crypto-ransomware in accordance with the disclosure.

FIG. 2 is a schematic of an embodiment of a GUI 400 that may be generated by the host 200 (or the SSD controller 100) for the detection of crypto-ransomware. The GUI 400 includes an input 410 for the user regarding the percentage of a drive, or the storage of a memory media 160, that the user would like to fill up with honeypot files. The user inputs the desired percentage in field 415 of the GUI 400. FIG. 2 shows an entry of 20% in field 415. In theory, the desired percentage could range from 1% to 100%, but the selection of 100% would not permit any additional files to be stored on the memory media 160, although the memory media 160 could be used to detect unauthorized access attempts. The percentage of files on a memory media 160 that comprise honeypot files changes as a user fills up the memory media 160. For example, when memory media 160 is empty prior to the distribution of the honeypot files, then 100% of the files on the memory media 160 will be honeypot files after the distribution. In the instance that the user selects 20% of the memory media 160 to be filled, then 20% of the memory media 160 will contain honeypot files and 80% will be empty. When the host 200 writes enough additional files to the memory media 160 to fill the memory media 160 to 40%, then 50% of the files on the memory media 160 will be honeypot files. When the host 200 writes enough additional files to fill the memory media 160 to 60%, then ⅓ of the files on the memory media 160 will be honeypot files. Only when the memory media 160 is completely full, will 20% of the files on the memory media 160 be comprised of honeypot files. Other routines for determining the storage of memory media are possible.

In an embodiment, the random distribution of the honeypot files is scaled onto the memory media 160, as it is filled up with other valid data from the host 200. For example using 20% as the selected percentage, if the storage of the memory media 160 is only filled 50% up with files, then 10% of the files on the memory media 160 would be honeypots and the other 40% would be valid data files. In the instance that 75% of the storage of a memory media 160 is filled by valid data files, then 15% of the total files on the memory media 160 would be honeypot files. In this embodiment, honeypot files will be generated and distributed onto the memory media 160 as the memory media 160 is filled up. The GUI 400 permits a user to dynamically change the percentage of honeypot files contained on a memory media 160. The GUI 400 permits a user to remove a first plurality of honeypots from a memory media 160 and then load on a second plurality of honeypots onto the memory media 160, which may fill a different percentage of the memory media 160, if selected by the user.

The GUI 400 includes an input 420 for the user regarding the detection level, also referred to as mode of operation, which may be selected by a user from a drop down menu or the like. The system 300 may operate in one of a plurality of different modes of operation. For illustrative purposes, FIG. 2 shows three different modes of operation, namely, light detection mode 421, moderate detection mode 422, and strict detection 423.

During normal, authorized operation, the host 200 should not be reading or writing to honeypot locations in memory media 160, as these are not valid data files. Consequently, a request from host 200 to access a honeypot location in memory media 160 may indicate an attempt at unauthorized access by a user. In a strict detection mode 423, also referred to as a first mode of operation, the processor 110 may halt access to the memory media 160 upon unauthorized single request from host 200 for access to a honeypot location in the memory media 160. The processor 110 may halt access to all memory media 160 controlled by the processor 110 if the location of a single honeypot is accessed on the memory media 160. The processor 110 may also request authentication from the host 200 upon accessing a single location of a honeypot prior to permitting any additional files on the memory media 160 to be accessed, at which point the host 200 may require the requesting user to authenticate themselves using whatever authentication methods are available to the host 200. In some instances, the processor 110 may halt access to all memory media 160 while awaiting authentication.

In a moderate detection mode 422, also referred to as a second mode of operation, the processor 110 may analyze the memory media 160 to determine if the memory media 160 is under attack upon the unauthorized access to a single recorded location of a randomly distributed honeypot on memory media 160. The processor 110 may use various analysis techniques in an attempt to determine if the memory media 160 is under attack. For example, the processor 110 may analyze any incoming input/output (I/O) commands, and based on the I/O commands, the processor 110 may make a determination if it appears a third party is repeatedly reading large chunks of files and then writing large chunks onto the memory media 160. Based on the analysis, the processor 110 may halt access to the memory media 160, halt access to all controlled SSD memory media 160, or request authorization prior to the access of any additional files on any controlled memory media 160. However, the processor 110 may permit continued access to the memory media(s) 160 if the analysis indicates that the memory media 160 is not under attack.

In a light detection mode 421, also referred to as a third mode of operation, the processor 110 may delay taking further action until multiple locations on the memory media 160 of the randomly distributed honeypot files have been accessed. For example, the processor 110 may be configured to permit the access of a predetermined number of randomly distributed honeypot locations prior to taking any action. Once the predetermined number of honeypot locations have been accessed, the processor 110 may take various actions such as analyzing the memory media 160 to determine whether the memory media 160 is under attack. Based on the analysis, the processor 110 may halt access to the memory media 160, halt access to all controlled memory medias 160, or request authorization prior to the access of any additional files on any controlled memory media 160. Alternatively, in the light detection mode 421 the processor 110 may halt access to the memory media 160, halt access to all controlled memory medias 160, or request authorization prior to the access of any additional files on any controlled memory media 160 once a predetermined number of randomly distributed honeypot locations have been accessed. Other modes of operation, combinations of the foregoing, or the like, are also possible.

The GUI 400 includes an input 430 for the user regarding the file types that may be generated as honeypots. The GUI 400 includes a drop down menu that permits the user to select various settings changing the types of files that are generated as honeypots. For example, the drop down menu may include Home/Personal 433, Business/Corporate 432, and Custom 431. The settings shown in FIG. 2 are for illustrative purpose and may be varied as would be appreciated by one of ordinary skill having the benefit of this disclosure. The types of files generated as honeypots may vary depending on the application. For example, it may be expected that a system 300 in a home or personal device may typically include different types of files than a system 300 in a business or corporate device.

The honeypot files are generated to create the illusion that they are actual valid data files and not a trap, or honeypot file, which actually contains random information. For example, the honeypot files may appear to be, but are not limited to, .sql, .mp4, .7z, .rar, .m4a, .wma, .avi, .wmv, .csv, .zip, .doc, .docx, .xls, .xlsx, .ppt, .pptx, .jpeg, .jpg, .txt, .pdf, .mp3, .tiff, .wav, .bmp, and .png files, as shown in field 435. Honeypot files may appear to be additional file types as would be appreciated by one of ordinary skill in the art having the benefit of this disclosure. The custom setting 431 may let the user designate the type of files that the honeypot files should be generated to appear as. The use of file types based on the application may reduce the likelihood that malware or the providers of malware may discover that a memory media 160 contains honeypot files prior to attempting to use crypto-ransomware to encrypt files on the memory media 160.

The GUI 400 includes username input 440 with a corresponding field 445 and a password input 450 with a corresponding field 455. Once a user has verified his/her credentials and selected the percentage to be filled 410, detection mode or mode of operation 420, and file types 430, the honeypots may be generated by selecting button 460. The GUI 400 permits the user to dynamically change the percentage of the memory media 160 to be filled with honeypot files, the mode of operation, and the file types used as honeypot files. Upon changing any one of the user inputs, a first plurality of honeypots may be removed from memory media 160 and a second plurality of honeypots may be stored onto memory media 160 with the new selected inputs.

Figure 3:
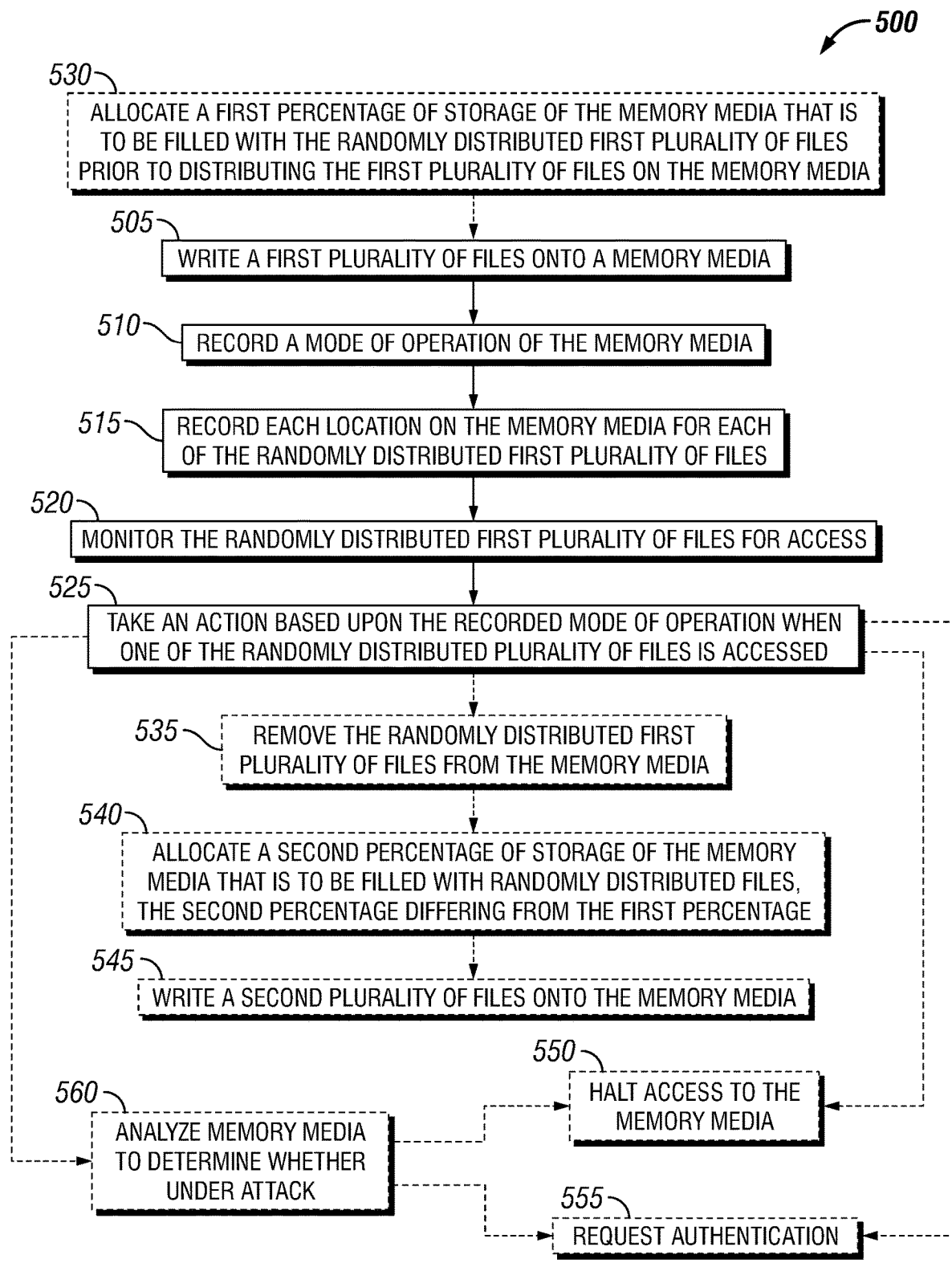
FIG. 3 is a flow chart of an embodiment of a method of detecting crypto-ransomware in accordance with the disclosure.

FIG. 3 is a flow chart for one embodiment of a method 500 of operating a memory device, including detecting crypto-ransomware. At step 505, the method 500 includes writing a first plurality of files onto a memory media. The first plurality of files may be honeypot files that are randomly distributed to locations of the memory media. The first plurality of files may be comprised of random types of files and may be comprised of files having random sizes. The method 500 includes recording a mode of operation of the memory media, at step 510. The mode of operation, or detection mode, may determine the action taken when one of the randomly distributed files is accessed, as discussed herein. As discussed previously, the determining of the mode of operation may include receiving a selection from a user or referring to configuration settings already stored in the controller, for example, setting that are stored in a register or in a configuration area of the memory media. The method 500 includes recording each location on the memory media of each of the randomly distributed first plurality of files, at step 515. The method 500 includes monitoring if any of the randomly distributed first plurality of files are accessed, at step 520. As discussed previously, this monitoring may include the controller evaluating read/write or other access requests from the host to determine if the addresses of honeypot files correspond to the requested address. If one of the randomly distributed plurality of files is accessed, the method includes taking an action based upon the recorded mode of operation, at step 525. Alternatively, the method 500 may not take action until more than one of the plurality of randomly distributed files are accessed.

The action taken may be halting access to the memory media, at optional step 550, requesting authentication, at optional step 555, or analyzing the memory media to determine whether the memory media is under attack, at optional step 560. If the memory media is under attack, the method may further take the steps of halting access to the memory media, at step 550, or requesting authentication, at step 555.

The method 500 may include allocating a first percentage of storage of the memory media that is to be filled with the randomly distributed first plurality of files prior to distributing the first plurality of files on the memory media, at step 530 prior to writing a first plurality of files onto a memory media at step 505. The allocation of the first percentage of storage of the memory media may correspond to a user selected variable. In an embodiment, the random distribution of the first plurality of randomly distributed files is scaled onto the memory media as it is filled up. The method 500 may include removing the randomly distributed first plurality of files from the memory media (e.g., erasing or programming the addresses associated with the honeypot files), at step 535, and allocating a second percentage of storage of the memory media that is to be filled with randomly distributed files that differs from the first percentage of storage of the memory media. The method 545 may include writing of the second plurality of files onto the memory media.

Figure 4:
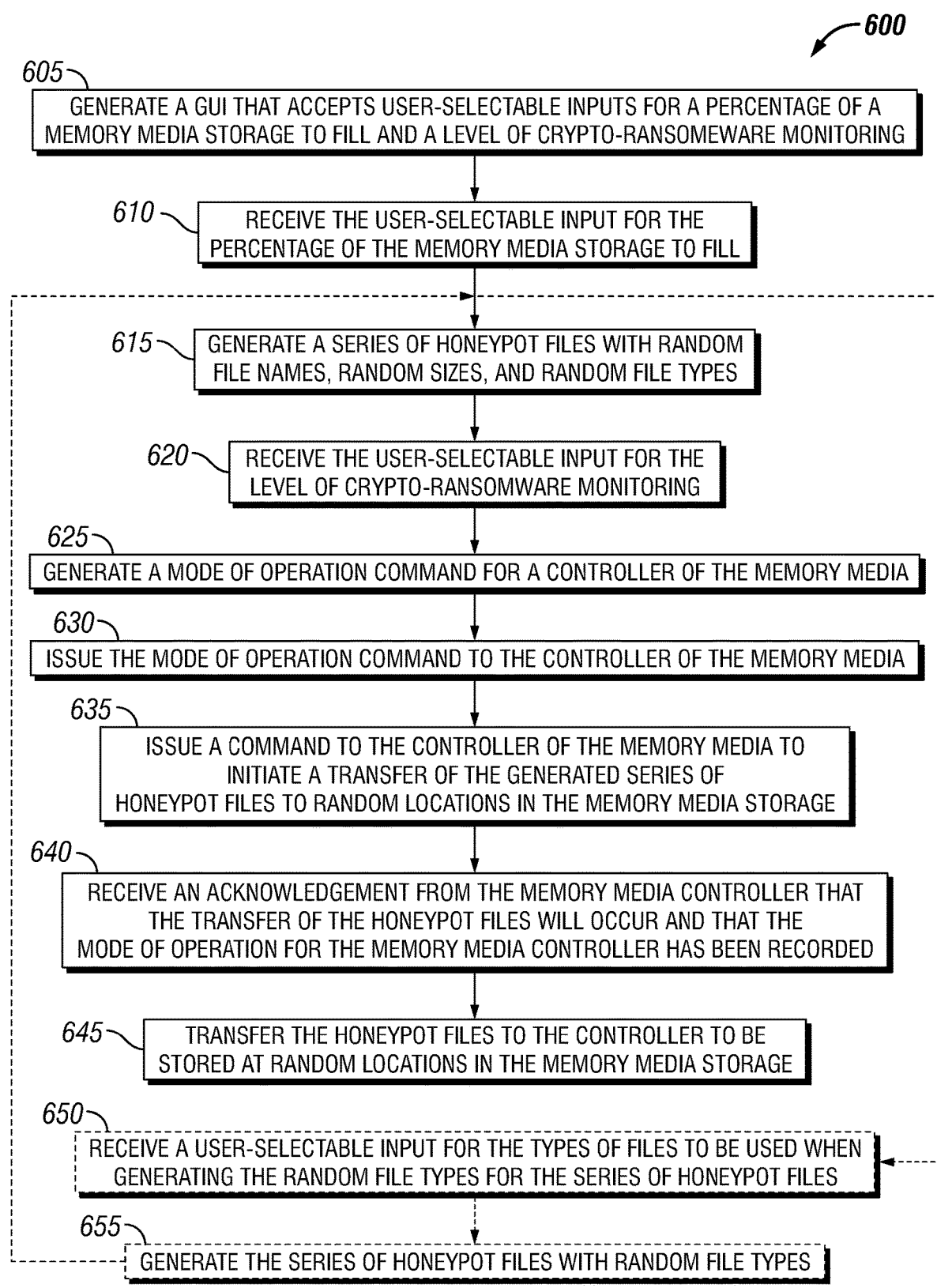
FIG. 4 is a flow chart of an embodiment of a method of protecting a solid state device (SSD) memory device from crypto-ransomware in accordance with the disclosure.

FIG. 4 is a flow chart for one embodiment of a method 600 of operating a memory device, for example, protecting a memory media from crypto-ransomware. While the steps of method 600 are shown sequentially in FIG. 4, each of the steps do not need to be fulfilled in the sequence shown. For example, step 620, receiving the user-selectable input for the level of crypto-ransomware monitoring, may be performed prior to steps 610 and 615, or the like. The method includes generating a GUI that accepts user-selectable inputs for a percentage of a memory media storage to fill, and a level of crypto-ransomware monitoring, at step 605. The level of crypto-ransomware may be selected from a strict detection mode, a moderate detection mode, and a light detection mode as discussed herein. However, the level of crypto-ransomware may be varied depending on the application as would be appreciated by one of ordinary skill in the art having the benefit of this disclosure. The method includes receiving the user-selectable input for the percentage of the memory media storage to fill, at step 610, and in response, generating a plurality of honeypot files with random file names, random sizes, and/or random file types, at step 615. The size of the generated plurality of honeypot files in total equals the user-selectable input for the percentage of the memory media storage to fill.

The method 600 includes receiving the user-selectable input for the level of crypto-ransomware monitoring, in step 620, and in response, generating a mode of operation command for a controller of the memory media, in step 625. The mode of operation command corresponds to the received input for the level of crypto-ransomware monitoring. The method 600 includes issuing the mode of operation command to the controller for the memory media, at step 630, and issuing a command to the controller of the memory media to write the generated plurality of honeypot files to random locations in the memory media storage, at step 635. The command to write the honeypot files may include a command for the controller to select the addresses for the random locations of the honeypot files itself or it may include the actual addresses of the random locations, as determined by the host. The method 600 includes receiving an acknowledgement from the SSD memory controller that the writing of the honeypot files will occur and that the mode of operation for the SSD memory controller has been set, at step 640. The method 600 includes transferring the honeypot files to the controller to be stored at random locations in the memory media storage, at step 645.

The GUI may accept a user-selectable input for the types of files to be used when generating the random file types for the plurality of honeypot files. The method 600 may include receiving the user-selectable input for the types of files to be used when generating the random files types for the plurality of honeypot files, at step 650. The method 600 may include generating the plurality of honeypot files with user-selected file types, at step 655. Although the file names, file types, locations, and/or content in this disclosure have been described as being "random," the file names, file types, locations, and/or content may not necessarily be completely "random" in a mathematical sense as would be appreciated by one of ordinary skill in the art having the benefit of this disclosure. For example, the file names, file types, locations, and/or content may be generated using pre-determined file names, file types, locations, and/or content in such a way that the file names, file types, locations, and/or content appears to be statistically random, or "random" to a third party. In another example, an algorithm or definite procedure may be generate file names, file types, locations, and/or content in such a way that the file names, file types, locations, and/or content appears to be statistically random, or "random" to a third party. Various other techniques may be used to generate file names, file types, locations, and/or content that appears to be "random" although each may only be pseudorandom, quasi-random, or not be completely random in a mathematical sense as would be appreciated by one of ordinary skill in the art having the benefit of this disclosure. The term "random" as used herein encompasses each of these techniques, and the like.

Although this disclosure has been described in terms of certain embodiments, other embodiments that are apparent to those of ordinary skill in the art, including embodiments that do not provide all of the features and advantages set forth herein, are also within the scope of this disclosure. Accordingly, the scope of the present disclosure is defined only by reference to the appended claims and equivalents thereof.

What is claimed is:

1. A method of operating a memory system comprising:
  allocating a first percentage of storage of a memory media that is to be filled with a randomly distributed first plurality of files prior to writing the first plurality of files on the memory media;
  writing the first plurality of files onto the memory media prior to a request to access the memory media, wherein the first plurality of files are randomly distributed to locations of the memory media;
  recording a mode of operation of the memory media;
  recording each location on the memory media for each of the randomly distributed first plurality of files;
  monitoring the randomly distributed first plurality of files for access; and
  taking an action based upon the recorded mode of operation when one of the randomly distributed plurality of files is accessed.

2. The method of claim 1, wherein the allocating the first percentage of the memory media that is to be filled with the randomly distributed first plurality of files includes receiving a user selected variable of the first percentage of storage of the memory media to be filled.

3. The method of claim 1, further comprising:
  removing the randomly distributed first plurality of files from the memory media;
  allocating a second percentage of the storage of the memory media that is to be filled with randomly distributed files, the second percentage differing from the first percentage; and
  writing a second plurality of files onto the memory media, wherein the second plurality of files are randomly distributed onto the memory media based on the second percentage.

4. The method of claim 1, wherein the randomly distributed first plurality of files comprise random types of files.

5. The method of claim 1, wherein the mode of operation comprises a first mode of operation and the action comprises requesting authentication.

6. The method of claim 1, wherein the mode of operation comprises a first mode of operation and the action comprises halting access to the memory media.

7. The method of claim 1, wherein the mode of operation comprises a second mode of operation and the action comprises analyzing the memory media.

8. The method of claim 7, further comprising requesting authentication if the analyzing indicates that the memory media is under attack.

9. The method of claim 7, further comprising halting access to the memory media if the analyzing indicates that the memory media is under attack.

10. The method of claim 1, wherein in the mode of operation comprises a third mode of operation and the action is not taken until more than one of the first plurality of randomly distributed files are accessed.

11. The method of claim 10, further comprising analyzing the memory media when more than one of the first plurality of randomly distributed files are accessed.

12. The method of claim 11, further comprising requesting authentication if the analyzing determines that the memory media is under attack.

13. The method of claim 11, further comprising halting access to the memory media when more than one of the first plurality of randomly distributed files are accessed.

14. A memory system comprising:
a controller including a processor; and
one or more memory media devices, wherein the processor is configured to allocate a first percentage of storage of the one or more memory media devices that is to be filled with a randomly distributed plurality of honeypot files prior to distributing the honeypot files and configured to randomly distribute the plurality of honeypot files on the memory media devices prior to a request to access the memory media devices, configured to set a detection mode, configured to record locations for each honeypot file on the memory media devices, configured to monitor access to any of the randomly distributed plurality of honeypot files, and configured to fill up a predetermined storage percentage of the memory media devices with the plurality of randomly distributed honeypot files.

15. The system of claim 14, wherein in a strict detection mode the processor is configured to halt access to the memory media devices or request authentication after a first access to any one of the honeypot files.

16. The system of claim 14, wherein in a moderate detection mode the processor is configured to analyze the memory media devices to determine if under attack and if under attack, the processor is configured to halt access to the memory media devices or request authentication.

17. The system of claim 14, wherein in a light detection mode the processor is configured to halt access to the memory media devices or request authentication after a predetermined number of randomly distributed honeypot files have been accessed.

18. The system of claim 14, wherein the memory media devices further comprise a NAND flash memory device.

19. The system of claim 14, wherein the plurality of randomly distributed honeypot files further comprises a plurality of files containing random file names and random sizes with the honeypot files each containing random information.

20. A system for the detection of crypto-ransomware comprising:
a memory media;
a host configured to generate a plurality of honeypot files; and
a controller, including a processor, the controller communicates with the memory media and is configured to control operation of the memory media and is configured to allocate a first percentage of storage of the memory media that is to be filled with a randomly distributed plurality of honeypot files prior to distributing the honeypot files,
wherein the controller is configured to randomly distribute the plurality of honeypot files generated by the host onto the memory media prior to a request to access the memory media, and wherein the controller is configured to monitor access of each of the randomly distributed plurality of honeypot files.

21. The system of claim 20, wherein the host includes a user selected detection mode, a user selected percentage of the storage of the memory media to be filled up with the randomly distributed plurality of files, and user selected types of files to be randomly distributed.

22. The system of claim 21, wherein the host is configured to generate a graphical user interface (GUI), wherein the GUI enables the input of user selections for the detection mode, the percentage of the storage of the memory media to be filled up, and the types of files to be randomly distributed.

23. A method of protecting memory media from crypto-ransomware comprising:
generating a graphical user interface (GUI) that accepts user-selectable inputs for a percentage of a storage of a memory media to fill, and a level of crypto-ransomware monitoring;
receiving the user-selectable input for the percentage of the storage of the memory media to fill prior to generating a plurality of honeypot files and, in response, generating the plurality of honeypot files with random file names, random sizes, and random file types, wherein the size of the generated plurality of honeypot files in total equals the user-selectable input for the percentage of the storage of the memory media to fill;
receiving the user-selectable input for the level of crypto-ransomware monitoring and, in response, generating a mode of operation command for a controller of the memory media corresponding to the received input for the level of crypto-ransomware monitoring;
issuing the mode of operation command to the controller of the memory media, and a command to the controller of the memory media to initiate a transfer of the generated plurality of honeypot files to random locations in the storage of the memory media;
receiving an acknowledgement from the controller of the memory media that the transfer of the honeypot files will occur and that the mode of operation for the controller of the memory media has been recorded; and
transferring the honeypot files to the controller to be stored at random locations in the storage of the memory media.

24. The method of claim 23, wherein the GUI accepts user-selectable input for types of files to be used when generating the random file types of the plurality of honeypot files, the method further comprising:
receiving the user-selectable input for the types of files to be used when generating the random file types for the plurality of honeypot files and, in response, generating the plurality of honeypot files with random file types, wherein the random file types are selected from the user-selected file types.

* * * * *